(12) United States Patent
Schuller et al.

(10) Patent No.: US 6,302,663 B1
(45) Date of Patent: Oct. 16, 2001

(54) PISTON PUMP

(75) Inventors: Wolfgang Schuller, Sachsenheim; Franz Mayer, Haldenwang; Christiane Schiller, Tamm, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/446,518

(22) PCT Filed: Feb. 9, 1999

(86) PCT No.: PCT/DE99/00342

§ 371 Date: Dec. 28, 1999

§ 102(e) Date: Dec. 28, 1999

(87) PCT Pub. No.: WO99/58853

PCT Pub. Date: Nov. 18, 1999

(30) Foreign Application Priority Data

May 9, 1998 (DE) .............................................. 198 20 902

(51) Int. Cl.[7] ...................................................... F04B 39/10
(52) U.S. Cl. ............................ 417/554; 417/549; 417/470
(58) Field of Search .................................. 417/554, 552, 417/545, 549; 92/172, 192

(56) References Cited

U.S. PATENT DOCUMENTS

| | | | | |
|---|---|---|---|---|
| 1,854,455 | * | 4/1932 | Day | 92/239 |
| 3,532,030 | * | 10/1970 | Margetts | 92/208 |
| 4,085,634 | * | 4/1978 | Sattler | 82/19 |
| 5,320,498 | * | 6/1994 | Fuchida | 417/554 |
| 5,395,219 | * | 3/1995 | Hosoya et al. | 417/554 |
| 5,601,345 | * | 2/1997 | Tackett | 303/116.4 |
| 5,988,997 | * | 11/1999 | Siegel | 417/554 |
| 6,093,003 | * | 7/2000 | Hauser et al. | 417/540 |
| 6,109,896 | * | 8/2000 | Schuller et al. | 417/549 |
| 6,113,365 | * | 9/2000 | Siegel | 417/554 |

* cited by examiner

Primary Examiner—Cheryl J. Tyler
(74) Attorney, Agent, or Firm—Ronald E. Greigg; Edwin E. Greigg

(57) ABSTRACT

The invention relates to a piston pump for a slip-controlled, hydraulic vehicle brake system. In order to be able to simply and inexpensively produce the piston pump as a stepped piston pump, the invention embodies a piston as a tubular deep drawn part made of sheet metal, with an outwardly protruding circumferential bead. The bead is produced by axially compressing the piston. The bead constitutes an axial support for a guide ring and sealing ring placed onto the piston. A disk-shaped, abrasion resistant striking piece is press-fitted into an open end of the tubular piston, and is used by the piston for resting against a circumference of a cam element used for the stroke drive.

20 Claims, 2 Drawing Sheets

PISTON PUMP

PRIOR ART

The invention relates to a piston pump which is provided for use in a slip-controlled or electrohydraulic vehicle brake system.

A multitude of such piston pumps have been disclosed. One such example is DE 40 27 794 A1. The known piston pump has a pump housing into which a bushing is inserted which contains an axially movable piston which can be driven into a reciprocating stroke motion. The piston is a part that is produced in a cutting fashion by means of boring and turning. The manufacture of the piston is therefore complex and cost intensive.

ADVANTAGES OF THE INVENTION

In the piston pump according to the invention, the piston is embodied as tubular and its manufacture takes place for example by means of deep drawing. By means of shaping, for example by means of axially compressing the tubular piston, an outwardly protruding bead is produced on the piston, and this bead constitutes an axial support for a sealing ring or a guide ring of the piston. First, the invention has the advantage that the piston can be produced in a non-cutting fashion by means of shaping and therefore can be produced rapidly, simply, and inexpensively. Moreover, the piston is distinguished by means of a high degree of measurement precision and surface quality so that a finishing is not necessary and the piston can also be inserted without a bushing directly into the cylinder bore of the pump housing and can be guided so that it can move axially. An inner chamber of the tubular piston acts as a damper chamber which eliminates the need for a separate fluid pressure fluctuation damper of the piston pump.

The piston of the piston pump according to the invention can be embodied as a so-called simple piston, i.e. the piston can be guided at two locations axially spaced from each other and which location have the same diameter. The piston is embodied as a stepped piston, i.e. the piston is guided in the vicinity of its bead on a different diameter, for example a larger diameter than in a region oriented in particular toward a drive cam. The stepping of the piston influences the delivery behavior of the piston pump; in particular, a suction can be produced both during a so-called suction stroke and during a so-called feed stroke, which evens out the delivery flow at least on the suction side of the piston pump.

The piston has a valve seat of an inlet or outlet valve of the piston pump and this valve seat is formed by means of shaping. This shaping has the advantage of a simple valve seat manufacture, which takes place in one work cycle with the piston production, has high quality, and has high abrasion resistance due to a material hardening during the shaping process.

In an embodiment of the invention, a striking piece is affixed to the piston, whose end face oriented toward a drive cam constitutes a striking face of the piston, with which the piston rests against the circumference of the drive cam element. The striking piece is abrasion resistant, at least in the vicinity of the striking face, for example by means of hardening or through the use of an abrasion resistant material. The piston is thus simply resistant to the stresses that occur due to friction on the striking face.

Accordingly, instead of the striking piece, the piston is embodied with an end wall, which is of one piece with the piston and is preferably formed onto the piston by means of shaping, with which the end wall rests against the circumference of the drive cam element. The end wall is embodied as abrasion resistant, at least in the region in which the end wall rests against the drive cam element, for example as a result of local hardening. In this manner, a separate striking piece is no longer needed and the manufacture of the end wall takes place in one work cycle with the piston production.

In an embodiment of the invention, the piston pump has a tubular bushing which is inserted into the cylinder bore of the pump housing. In an improvement, a valve seat of an outlet or inlet valve of the piston pump is affixed to the bushing by means of shaping. As a result, the valve seat is produced in a simple manner in one work cycle with the production of the bushing. The valve seat has a high surface quality and, due to material hardening during the shaping, has a high degree of abrasion resistance.

In order to close the cylinder bore on an end remote from the drive cam, the piston pump according to the invention has a closing element that is produced as a deep drawn part. This embodiment of the invention has the advantage that the closing element can be produced rapidly, inexpensively, and without cutting. The valve seat of an outlet or inlet valve of the piston pump is affixed to a valve seat part that is produced by means of shaping, for example deep drawing. This embodiment has the same advantages as the valve seat produced on the bushing by means of shaping; it is particularly provided for piston pumps without bushings.

The piston pump according to the invention is provided as a pump in a brake system of a vehicle and is used in the control of pressure in wheel brake cylinders. The abbreviations ABS, TCS, ESP, or EHB are used for such brake systems, depending on the type of brake system. In the brake system, the pump serves for instance to return brake fluid from a wheel brake cylinder or a plurality of wheel brake cylinders to a master cylinder (ABS) and/or to supply brake fluid from a storage tank into a wheel brake cylinder or a plurality of wheel brake cylinders (TCS, ESP, or EHB). The pump is required, for example, in a brake system with wheel slip control (ABS or TCS) and/or a brake system serving as a steering aid (ESP) and/or an electrohydraulic brake system (EHB). With wheel slip control (ABS or TCS), for example, a locking of the wheels of the vehicle during a braking event when there is strong pressure on the brake pedal (ABS) and/or a spinning of the driven wheels of the vehicle when there is strong pressure on the gas pedal (TCS) can be prevented. In a brake system that serves as a steering aid (ESP), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB) in which the pump supplies the brake fluid into the wheel brake cylinder or cylinders if an electrical brake pedal sensor detects an actuation of the brake pedal or in which the pump is used to fill a reservoir of the brake system.

DESCRIPTION OF THE DRAWINGS

The invention will be explained in detail below in conjunction with two preferably selected exemplary embodiments shown in the drawings. The FIG. 1 shows an sectional view axial sections through a piston pump according to the invention.

DESCRIPTION OF THE FIRST EXEMPLARY EMBODIMENT

Figure 1:
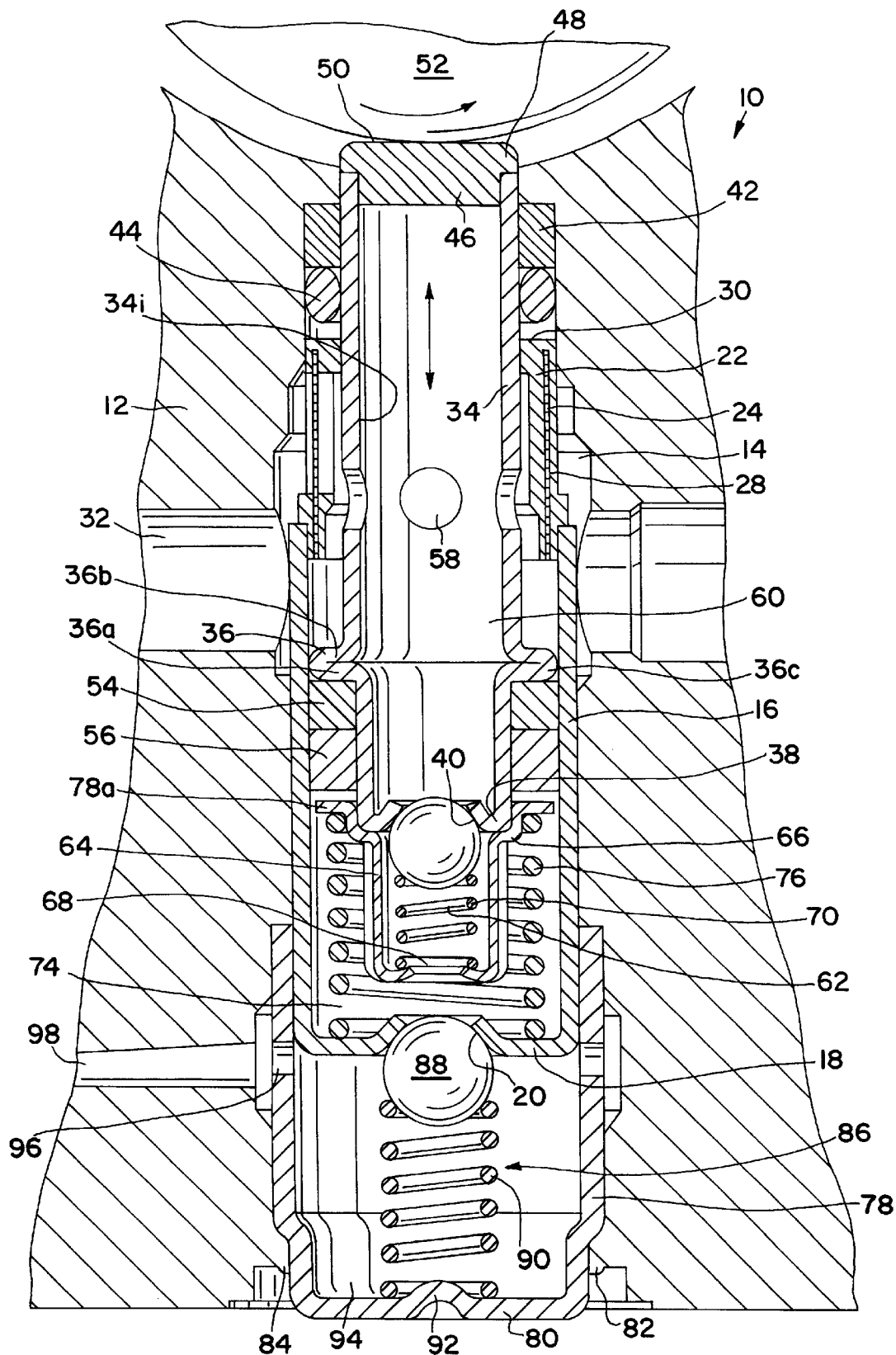

The piston pump 10 according to the invention shown in FIG. 1 is accommodated in a hydraulic block 12 of a slip-controlled vehicle brake system that is not shown in detail. Other hydraulic components, not shown, for example solenoid valves of the slip-controlled vehicle brake system, are inserted into the hydraulic block 12, of which only a fraction encompassing the piston pump 10 is shown for the sake of clarity, and these hydraulic components are hydraulically connected to one another and to the piston pump 10 by means of the hydraulic block 12. The hydraulic block 12 is hydraulically connected to a master cylinder, not shown, and wheel brake cylinders, not shown, are connected to the hydraulic block. The hydraulic block 12 constitutes a pump housing 12 of the piston pump 10 according to the invention and will be referred to as such below.

A cylinder bore 14 is let into the pump housing 12 and a bushing 16 is press-fitted into this cylinder bore. The bushing 16 is a cylindrical, tubular component which is manufactured in one work cycle by means of shaping, particularly by means of being deep drawn out of sheet metal. The bushing 16 is of one piece with a bushing bottom 18 in which a valve seat 20 is formed by means of shaping in one work cycle with the production of the bushing 16.

A hollow, cylindrical filter element 22 in an extension of the bushing 16 is press-fitted into an open end of the bushing 16. The filter element 22 has a hollow, cylindrical filter sieve 24, which is injection molded with a filter frame made of plastic which has axially extending filter struts 28 disposed distributed over the circumference which on their ends transition in one piece into a filter ring 30 in which the ends of the filter sieve 24 are embedded. As a pump inlet, the piston pump 10 according to the invention has an inlet bore 32 radial to the cylinder bore 14 from which brake fluid to be supplied by the piston pump 10 enters into the cylinder bore 14 and, after flowing through the filter sieve 24, travels into the interior of the bushing 16.

A piston 34 is contained so that the piston moves axially in the bushing 16. The piston 34 protrudes from the open end of the bushing 18, projects through the hollow, cylindrical filter element 22, and protrudes out from the filter element 22 into the cylinder bore 14. The piston 34 is tubular, having an inner surface 34i, and a constant wall thickness, and is manufactured by shaping, as by being deep drawn out of sheet metal. On the inside of the bushing 16, the bushing has a circumferential, radially protruding bead 36, which is produced by means of an axial compression of the piston 34. The bead 36 is formed of a first collar 36a and a second collar 36b, both of which extend transversely to the piston. At its outer end, collar 36b is bent over to form a radially outwardly directed circumferential edge 36c, which joins the collars 36a and 36b. By the bead being formed in this fashion, the inside surfaces 34i of the collars face each other at the bead 36. On the piston end disposed in the bushing 16, the piston 34 has a piston bottom 38 that is of one piece with the piston, in the center, a valve seat 40 is affixed by shaping in one work cycle with the production of the piston 34. Just like the valve seat 20 on the bushing bottom 18, the production of the valve seat 40 on the piston bottom 38 produces a material hardening in the vicinity of the valve seat 20, 40, which increases the abrasion resistance of the valve seats 20 and 40. The valve seats 20 and 40 can be additionally hardened.

The upper end of the piston 34 protruding from the bushing 16 is guided so that the end can move axially by a guide ring 42 inserted into the cylinder bore 14 and is sealed by a sealing ring 44 in the pump housing 12.

A disk-shaped striking piece 46 is press-fitted in a fluid tight manner into the piston 34 on the upper end of the piston 34 protruding from the bushing 16 until a circumferential stop shoulder 48 contacts the piston 34. In order to assure tightness, the striking piece 46 can for example be welded to the piston 34, in particular laser-welded. The striking piece 46 is produced by means of shaping, for example by means of being cold-formed out of steel. The shaping process produces a material hardening which increases the abrasion resistance of the striking piece 46. An outer end face of the striking piece 46 constitutes a striking face 50 with which the piston 34 rests against the circumference of a cam 52 that can be driven to rotate by an electric motor. The cam 52 is used in an intrinsically known manner to drive the piston 34 into a stroke motion that reciprocates in the axial direction. In order to increase the abrasion resistance, the striking piece 46 can be hardened completely or at least in the vicinity of the striking face 50.

On the piston end disposed in the bushing 16, the piston 34 is guided by means of a guide ring 54 in the bushing 16 and is sealed by means of a sealing ring 56. The guide ring 54 is placed onto the end of the piston 34 on a side of the bead 36 oriented toward the bushing bottom 18. The bead 36 constitutes an axial support for the guide ring 54. The sealing ring 56 is placed so that the sealing ring axially adjoins the guide ring 54 on the end of the piston 34 disposed in the bushing 16. The piston 34 is therefore guided and sealed on a greater diameter in the bushing 16 than on its end protruding from the bushing 16 into the cylinder bore 14; the piston 34 is consequently embodied as a stepped piston.

For the fluid inlet, four inlet openings 58 distributed over the circumference are punched out of the circumference of the piston 30 on the side of the bead 36 remote from the bushing bottom 18. Brake fluid travels from the interior of the bushing 16 through these inlet openings 58 into an inner chamber 60 of the tubular piston 34. The inner chamber, which has a large volume because of the thin-walled embodiment of the piston 34, constitutes a suction-side damper chamber 60 of the piston pump 10 according to the invention, the damper chamber damps brake fluid pressure fluctuations which are caused in particular by the pulsating delivery action of piston pump 10.

An inlet valve 62 of the piston pump 10, which is embodied as a spring-loaded check valve, is affixed to the end of the piston 34 disposed in the bushing 16. The inlet valve 62 has a cup-shaped valve cage 64, which is produced as a deep drawn part made of sheet metal and is placed with a circumferential annular step 66 onto the end of the piston 34 from the outside. The valve cage 64 is provided with one or a number of punched-out brake fluid openings 68. A helical compression spring is inserted into the valve cage 64 as a valve closing spring 70 that presses a valve ball, which constitutes a valve closing body of the inlet valve 62 and is enclosed in the valve cage 64, against the valve seat 40 on the piston bottom 38. The inlet valve 62 affixed to the piston 34 is disposed in a displacement chamber 74 of the piston pump 10, which is circumferentially encompassed by the bushing 16 and is bounded on the end face by the bushing bottom 18 on the one end and by the piston bottom 38 and the sealing ring 56 placed onto the piston 34 on the other end. A volume of the displacement chamber 74 increases and decreases during the reciprocating stroke motion of piston 34, by the piston pump 10 which delivers brake fluid in an intrinsically known manner.

A helical compression piston restoring spring 76 is inserted into the displacement chamber, the restoring spring is supported against the inside of the bushing bottom 18 and presses against a circular, disk-shaped spring plate 78a which is formed in one piece onto a free edge of the valve cage 64 and protrudes radially outward from the restoring spring. The piston restoring spring 76 presses the piston 34 with its striking face 50 against the circumference of the cam 52. The piston restoring spring 76 is embodied as powerful so that it holds the piston 34 in contact with the cam 52 under all loads that occur in the operation of the piston pump 10 and holds the valve cage against the piston 34 counter to the force of the valve closing spring 70.

The bushing 16 with the piston 34 inserted into the bushing to which the inlet valve 62 is affixed, along with the piston restoring spring 76 and the filter element 22 that is press-fitted into the bushing 16, constitutes a preassembled unit. As a result, the filter element 22 constitutes a captive retainer for the piston 34, in that the filter element holds the piston 34 at its bead 36 until the bushing has been inserted into the cylinder bore 14. Simultaneously, the filter element 22 aligns the piston 34 with its filter ring 30 remote from the bushing 16 axially in the bushing 16 until the insertion of the preassembled unit into the cylinder bore 14, by which the insertion and press-fitting of the preassembled unit into the cylinder bore 14 can be executed with no trouble. The bushing 16 that is press-fitted into the cylinder bore 14 hydraulically divides a low-pressure side (pump inlet) from a high-pressure side (pump outlet).

An end of the cylinder bore 14 remote from the cam 52 is closed in a pressure-tight manner by means of a closure element 78. The closure element 78 is embodied as a hollow, cylindrical deep drawn part made of sheet metal, which is of one piece with a closure bottom 80 that has no openings. The closure element 78 has a circumferential annular step 82 at which the closure element is secured and sealed in a pressure-tight manner by means of a circumferential caulk 84 of the pump housing 12.

An outlet valve 86 of the piston pump 10, which is embodied as a spring-loaded check valve, is inserted into the closure element 78. A valve ball 88 is pressed as a valve closing body against the valve seat 40 on the bushing bottom 18 by a valve closing spring 90 in the form of a helical compression spring. The valve closing spring 90 is supported against the closure bottom 80 which has an inwardly protruding, dome-shaped spring centering piece 92 formed onto the end 80 for centering the valve closing spring 90. An inner chamber of the closure element 78 constitutes a damper chamber 94 which damps brake fluid pressure fluctuations at the pump outlet.

A pump outlet takes place through one or a number of punched-out openings 96 in the circumference of the closure element 78 into an outlet bore 98 formed into the pump housing 12 radial to the cylinder bore 14.

Description of the Second Exemplary Embodiment

Figure 2:
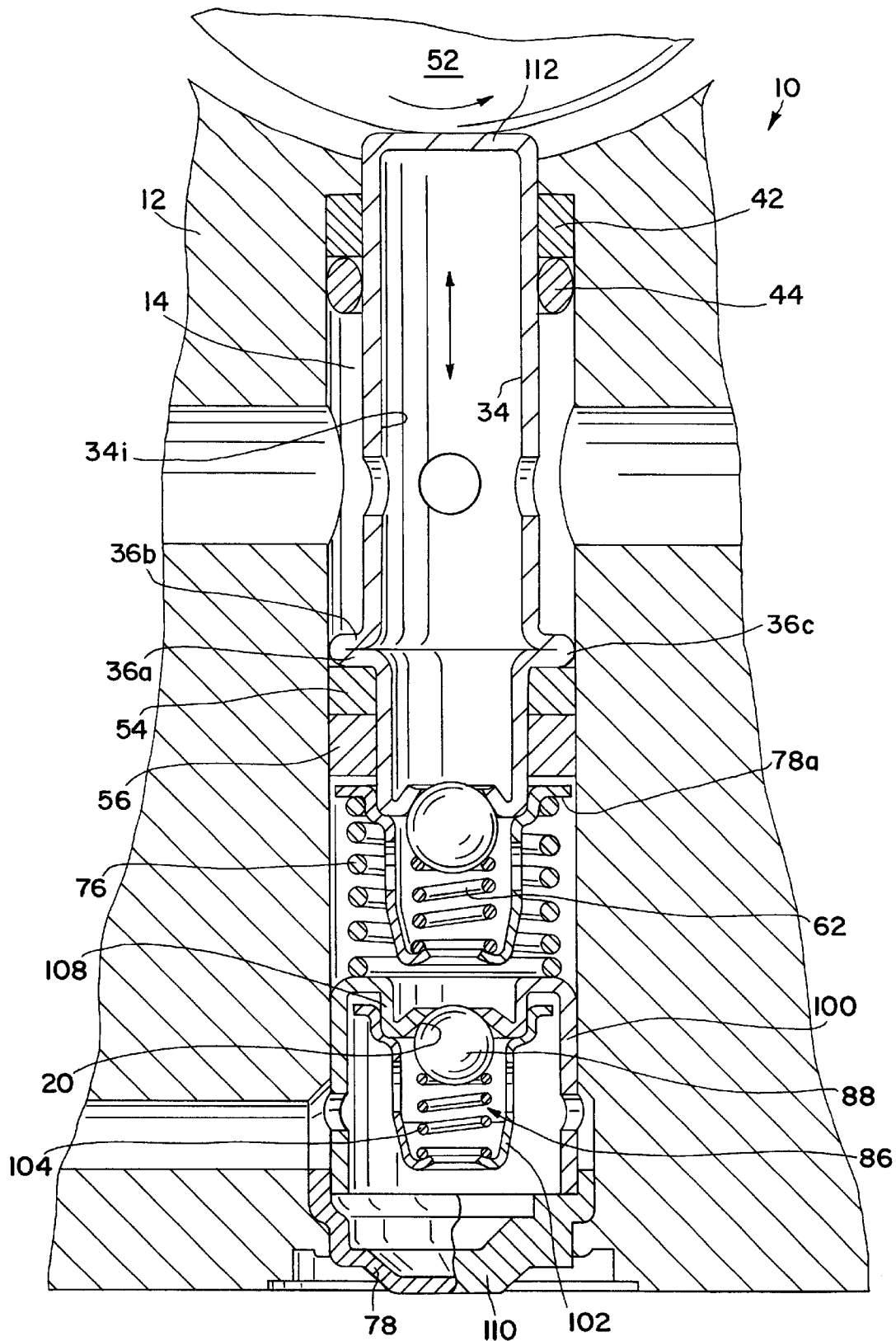
FIG. 2 is a cross sectional view of a modification of FIG. 1.

The piston pump 10 according to the invention shown in FIG. 2 has a piston 34 with an inlet valve 62 affixed to the piston like the piston pump 10 shown in FIG. 1. The piston pump 10 shown in FIG. 2 is likewise inserted into a cylinder bore 14 in a hydraulic block 12 which constitutes a pump housing 12. In contrast to the piston pump 10 shown in FIG. 1, the piston pump 10 shown in FIG. 2 does not have a bushing nor does it have the filter element press-fitted into the bushing; the piston 34 of the piston pump 10 shown in FIG. 2 is guided directly in the cylinder bore 14 with the guide ring 42 that is inserted into the cylinder bore 14 and the guide ring 54 that is placed onto the piston 34 and is sealed with the sealing ring 44 that is inserted into the cylinder bore 14 and the sealing ring 56 that is placed onto the piston 34. In order to avoid repetition, the differences from the piston pump 10 shown in FIG. 1 will be explained below and otherwise, reference will be made to the above explanations in relation to the first exemplary embodiment of the invention. Parts that are the same will be given the same reference numerals.

In the piston pump 10 shown in FIG. 2, the valve seat 20 of the outlet valve 86 is embodied on a valve seat part 100. The valve seat part 100 is a hollow, cylindrical deep drawn part made of sheet metal which is press-fitted into the cylinder bore 14. The valve seat 20 is of one piece with the valve seat part 100 and is affixed to the valve seat part by shaping. The outlet valve 86 is embodied in a manner that corresponds with the inlet valve 62; the outlet valve has precisely the same valve cage 102 and a valve closing spring 104 inserted into the valve cage 102, which presses the valve ball 88 against the valve seat 20. The valve cage 102 is supported with an annular step on a collar 108 that is formed in one piece onto the valve seat part 100.

Like the cylinder bore 14 of the piston pump 10 shown in FIG. 1, the cylinder bore 14 of the piston pump 10 shown in FIG. 2 is closed in a pressure-tight manner with a closure element 78 that is produced as a deep drawn part made of sheet metal, wherein the closure element 78 of the piston pump 10 shown in FIG. 2 is axially shorter than the closure element 78 of the piston pump 10 shown in FIG. 1. Instead of the deep drawn closure element 78, a closure element 110 that is produced by means of shaping, for example by means of cold-forming, can also be press-fitted into the cylinder bore 14 as shown in the right half of FIG. 2.

The valve seat part 100 with the outlet valve 86 affixed to the valve seat part and the closure element 78 that is press-fitted onto the valve seat part 100 constitute a preassembled unit.

Instead of a striking piece, the piston 34 has an end wall 112 that is of one piece with the piston and is disposed on the piston end oriented toward the cam 52, with which the piston end wall 112 rests against the circumference of the cam 52. The end wall 112 is produced by shaping in one work cycle with the production of the piston. It is hardened by means of nitrocarbonitration, at least in the vicinity of the contact area with the cam 52 and is therefore embodied as abrasion resistant. An end wall 112 of this kind can also be provided on the piston 34 of the piston pump 10 shown in FIG. 1 instead of the striking piece 46. It is likewise possible to provide the piston 34 of the piston pump 10 shown in FIG. 2 with a striking piece 46 instead of the end wall 112.

The foregoing relates to a preferred exemplary embodiments of the invention, it being understood that other variants and embodiments thereof are possible within the spirit and scope of the invention, the latter being defined by the appended claims.

What is claimed is:

1. A piston pump for a vehicle brake system, which comprises a pump housing that has a cylinder bore which contains an axially movable piston that is driven to execute a reciprocating stroke motion, the piston (34) is a tubular component formed from sheet metal by a deforming process, and having a longitudinal axis, the piston also having an outwardly protruding bead (36) which is formed by further deforming the metal of the piston, the bead (36) being formed of a first collar (36a) which extends substantially transversely to the longitudinal axis of the piston, a second collar (36b) which extends substantially transversely to the longitudinal axis of the piston, and an outwardly pointing edge (36c), the second collar (36b) being bent over to the first collar (36a) in the region of the outwardly pointing edge (36c), one or more rings (54, 56) placed on said piston (34), and said outwardly protruding bead (36) constitutes an axial support for said one or more rings (54, 56) placed onto the piston (34).

2. The piston pump according to claim 1, in which the bead (36) is produced by means of compressing the piston (34) along a length of the piston.

3. The piston pump according to claim 1, in which the piston (34) is a deep drawn part.

4. The piston pump according to claim 1, in which the piston (34) is embodied as a stepped piston.

5. The piston pump according to claim 1, in which the piston (34) has a valve seat (40) that is produced by shaping and is a part of a valve (62) of the piston pump (10), said valve controls fluid flow in a pump through-flow direction.

6. The piston pump according to claim 1, in which the piston (34) has a striking piece (46) on one end and the striking piece (46) has an abrasion resistant face which rests against a circumferential face of a cam element (52) that is driven to rotate.

7. The piston pump according to claim 1, in which the piston (34) has an end wall (112) that is of one piece with the piston, said end wall includes an abrasion resistant surface which rests against a circumferential surface of a cam element (52) that is driven to rotate.

8. The piston pump according to claim 1, in which the piston pump (34) has a tubular bushing (16) that is inserted into the cylinder bore (14) of the pump housing (12) and the piston (34) is guided so that the piston is moved axially in said bushing (16).

9. The piston pump according to claim 8, in which the bushing (16) has a valve seat (20) that is produced by deforming the metal of the bushing, the valve seat forming a part of a valve (86) of the piston pump (10), said valve controlling fluid flow through the pump.

10. The piston pump according to claim 1, in which the piston pump (10) has a closure element (78) for the cylinder bore (14), said closure element is embodied as a deep drawn part and is inserted into the pump housing (12) on an end of the piston pump (10) remote from a cam element (52) so that the closure element seals the cylinder bore (14) in a pressure-tight manner.

11. The piston pump according to claim 1, in which the piston pump (10) has a valve seat part (100) that is inserted into the cylinder bore and manufactured as a shaped part, and has a valve seat (20) that is produced by shaping and is a part of a valve (86) of the piston pump (10), said valve controls a fluid flow in a pump through-flow direction.

12. The piston pump according to claim 11, in which the piston pump (10) has a preassembled unit that includes the valve seat part (100) and the valve (86).

13. The piston pump according to claim 12, in which the preassembled unit includes the closure element (78).

14. The piston pump according to claim 1, wherein the one or more rings placed on the piston is a guide ring (54).

15. The piston pump according to claim 1, wherein said one or more rings placed on the piston is a sealing ring (56).

16. The piston pump according to claim 1, wherein said one or more rings placed on the piston are a guide ring (54) and a sealing ring (56).

17. The piston pump according to claim 1, wherein in the process of forming the piston by the deformation of sheet metal, the tubular component which is the piston has a wall thickness which is constant throughout its extent.

18. The piston pump according to claim 1 wherein the piston (34) has an inner face (34i), and wherein the second collar (36b) is bent over to the first collar (36a) in such a way that an inner face of the first collar (36a) is oriented toward an inner face of the second collar (36b).

19. The piston pump according to claim 1 wherein the bead (36) is formed by an axial compression operation of the piston (34).

20. The piston pump according to claim 19 wherein the axial compression operation forms the bead (36) from the first collar (36a) and the second collar (36b), by bending their outer edges over toward each other.

* * * * *